United States Patent [19]

Forestier

[11] 4,445,007
[45] Apr. 24, 1984

[54] REMOTE TESTING OF SUBSCRIBER LINE INTERFACE CIRCUITS

[75] Inventor: Alain Forestier, Lannion, France

[73] Assignee: Telecommunications Radioelectriquest et Telephoniques T.R.T., Paris, France

[21] Appl. No.: 356,605

[22] Filed: Mar. 9, 1982

[30] Foreign Application Priority Data

Mar. 18, 1981 [FR] France .................. 81 05408

[51] Int. Cl.³ .............................................. H04B 3/46
[52] U.S. Cl. ........................................... 179/175.3 R
[58] Field of Search ............... 179/175.3 R, 175.3 F, 179/175.2 A, 175.2 B, 175.2 C

[56] References Cited

U.S. PATENT DOCUMENTS 4,317,967 3/1982 De Vries et al. ............ 179/175.3 R

Primary Examiner—Stafford D. Schreyer
Attorney, Agent, or Firm—Thomas A. Briody; William J. Streeter

[57] ABSTRACT

This test system is intended to test subscriber line interface circuits (1), (2), ... etc. which are connected by means of one end to subscriber lines and by means of the other end are put in connection with a test apparatus (107). Change-over means (26), (27) or (76), (77) are provided to disconnect each interface circuit such as the interface circuit (1) or the interface circuit (2) from its subscriber line and to connect it to a test bus (112), (113) which is common to one group of interface circuits. Control means are provided in the test appartus (107) for connecting, depending on the test to be effected, one interface circuit or two interface circuits to the test bus. This test system allows remote testing of interface circuits, for example from a telephone exchange by using only the normally existing links between this exchange and the interface circuits.

7 Claims, 1 Drawing Figure

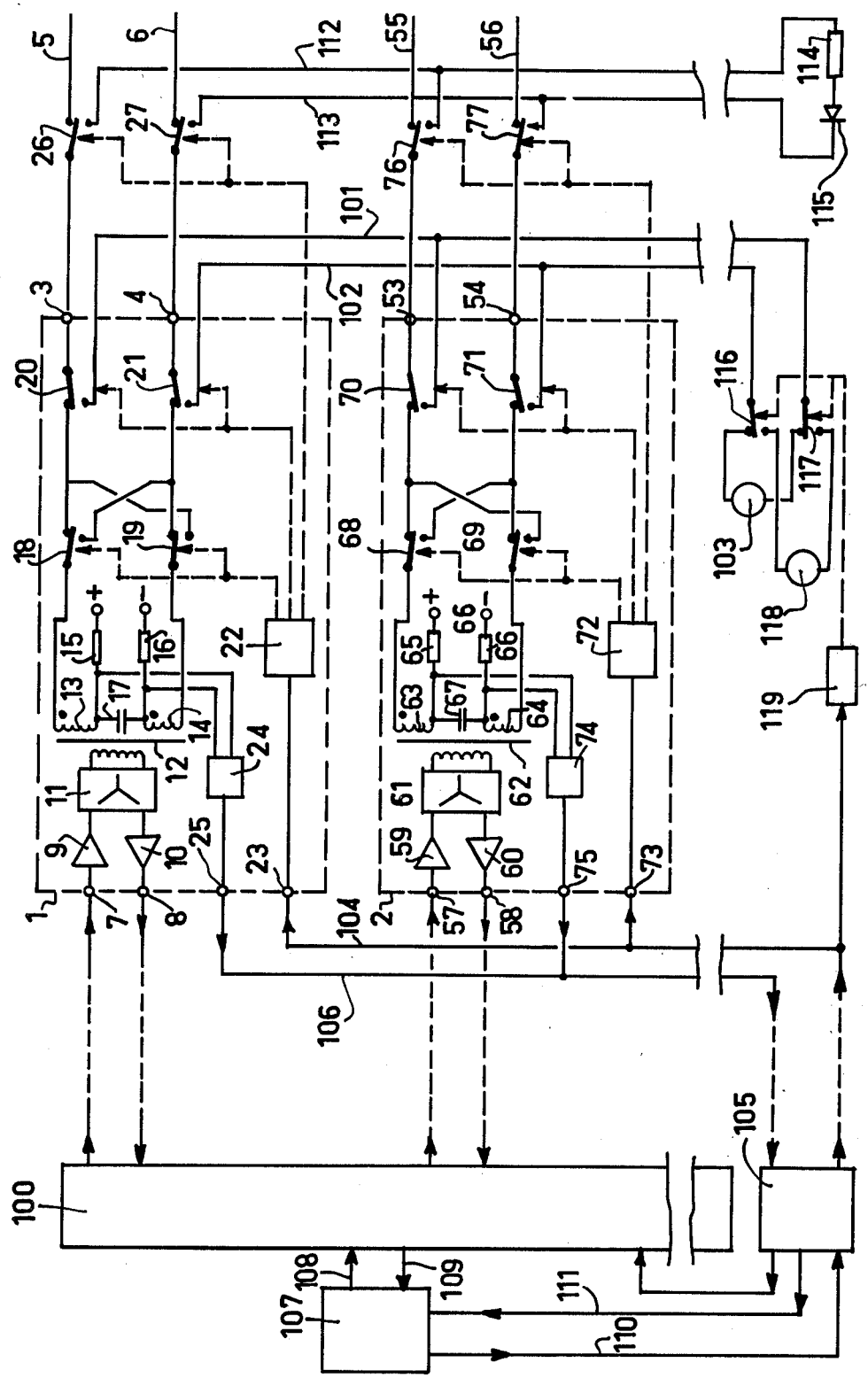

REMOTE TESTING OF SUBSCRIBER LINE INTERFACE CIRCUITS

The invention relates to a system for testing subscriber line interface circuits one end of which is connected to the subscriber line and the other end is connected, during a test, with a test apparatus transmitting test signals towards the subscriber line interface circuits and receiving from these subscriber line interface circuits signals which correspond with these test signals.

It is a known fact that subscriber connecting networks, i.e. subscriber line interface circuits, have very diverse functions. Via its two-wire terminal means connected to a subscriber line, an interface circuit must supply this line with a direct current or ringing current. Via its four-wire terminal means which must be connected to the connecting network of a telephone exchange the interface circuit receives speech signals coming from the exchange and transmits speech signals towards this exchange, a two-wire to four-wire converter circuit rendering it possible to effect that the speech signals received and transmitted by the individual terminals of the four-wire terminal means appear on the same terminals of the two-wire terminal means with a minimum of loss in the interface circuit and a minimum degree of coupling between the two transmission paths. Amplfiers are generally provided to amplify the voice signals. A subscriber line interface circuit is inter alia linked with the telephone exchange to receive therefrom control signals such as the ringing control signal for the battery inverter control signals and to apply thereto the loop detection signal indicating the off-hook condition of the set or loop interruptions.

The testing system relates to installed subscriber line interface circuits and has for its object to automatically check the functioning of all the circuits which, in these interface circuits, ensure the diverse functions mentioned above.

In a first prior art system which is described in French patent specification No. 2,399,775, each interface circuit is tested separately. During a test, a transmitter and a receiver for test signals having the voice frequencies are connected to the four-wire terminal means of the interface circuit to be tested. The test is based on the fact that a portion of the test signals supplied by the transmitter reaches the receiver as the result of a certain degree of natural or provoked unbalance of the two wire-four wire coupling circuit. But it will be obvious that such a system does only furnish a continuity test for circuits transmitting signals at the voice frequency and does not furnish the possibility of testing all these circuits (particularly the amplifiers) in their normal operating conditions. Furthermore, all the circuits of the interface circuit which have functions other than the transmission of the speech signals are not tested.

In a second known test system, each interface circuit is also tested separately, but by connecting it to an automatic testing apparatus not only its four-wire terminal means but also its two-wire terminal means and its terminal for receiving control signals and the loop detection signal are tested. It will therefore be obvious that with a test apparatus comprising all the transmitters and receivers for the required test signals and suitable measuring apparatus it is possible to test the circuits of the interface circuit in every desired operating condition. This test system is perfectly satisfactory when all the subscriber line interface circuits to be tested are located in the same place as the automatic test apparatus (for example in a telephone exchange). But this test apparatus is rather costly and its use is only justified when it is used for a rather considerable number of interface circuits (for example of the order of one thousand interface circuits). In certain types of telecommunication systems serving subscribers which are located very far from the telephone exchange, the subscriber line interface circuits are grouped into a certain number of scattered localities remote from the telephone exchange. Each group comprises only a limited number of interface circuits which are only in connection with the telephone exchange via their four-wire terminal means and their terminals for control signals and loop detection signals. With the second prior art test system it is necessary to provide each group of interface circuits with an automatic test apparatus, which is a very costly solution.

The present invention has for its object to mitigate this disadvantage by furnishing a system by means of which it is possible with a test apparatus located in one central place such as a telephone exchange, to test remotely subscriber interface circuits in every desired operating condition, while using only the normal existing links.

According to the invention, in a system of testing subscriber line interface circuits a testbus is provided jointly for one group of interface circuits and in that change-over means are provided for disconnecting each interface circuit from its subscriber line and connecting it to the said test bus, control means being provided in the test apparatus for connecting, depending on the test to be effected, one interface circuit or two interfaace circuits to the said test bus.

For testing the speech circuits of the interface circuits the test apparatus is provided with a transmitter and a dialling signal receiver, with control means for simultaneously connecting two interface circuits to be tested to the test bus and with control means for simultaneously connecting the receive terminal of an interface circuit and the transmit terminal of the other interface circuit to the transmitter and to the dialling signal receiver, respectively, the signal supplied by this receiver providing an indication of how the tested speech circuits in the two interface circuits operate.

For testing the ringing circuits of the interface circuits two interface circuits are also simultaneously connected to the test bus and a dialling signal instead of the ringing signal is applied to the interface circuit whose ringing signal one wants to test, this dialling signal being received by a receiver of the test apparatus via the speech circuits of the other interface circuit.

For testing the loop detection circuit of each interface circuit, this interface circuit is successively connected to and disconnected from a loop constituted by the test bus and is closed again via a resistor having substantially the resistance of a normal subscriber group. Observing in the test apparatus the output signal of the loop detection circuit renders it possible to check its operation.

For testing the battery inverter circuit of each interface circuit, this interface circuit is connected to a loop formed by the test bus which is closed again via a diode which is arranged in series with a resistor having substantially the resistance of a normal subscriber loop; the inversion of the battery is controlled in this interface circuit. Observing in the test apparatus the output signal of the loop detection circuit of the interface circuit renders it possible to check the operation of its battery inverter circuit.

The following description given by way of example with reference to the accompanying drawing will make it better understood how the invention can be put into effect.

The only FIGURE shows the system for testing subscriber line interface circuits in accordance with the invention.

This FIGURE shows two subscriber line interface circuits 1 and 2, which form part of a group of subscriber line interface circuits to be tested. The subscriber line interface circuit 1 comprises a two-wire terminal means formed by two terminals 3 and 4 which are to be connected to two wires 5 and 6 of the subscriber line. The four-wire terminal means of the subscriber line interface circuit 1 is formed by a receive terminal means shown for the sake of simplicity in the form of one signal terminal 7 and a transmit terminal means which is also represented by one single terminal 8. The terminals of the four-wire terminal means of the interface circuit are connected to a connecting network 100 of a telephone exchange which may be located either near to or remote from the interface circuits to be tested, as will be further explained hereinafter.

As shown by means of the simplified representation of the FIGURE, the receive terminal means 7 and the transmit terminal means 8 of the interface circuit 1 are connected to a two wire-four wire coupling circuit (or hybrid junction) 11 via the respective amplifiers 9 and 10. The two-wire output of the hybrid junction 11 is connected to a winding of the transformer 12 which has two further identical windings 13 and 14. A dot near one end of the windings 13 and 14 indicates in a conventional manner the winding sense of these windings; this end is designated winding input and the other end is designated winding output. The output of winding 13 and the input of the winding 14 are connected to the positive and negative terminal, respectively of a power supply battery, not shown, via two resistors 15 and 16 of equal values. In addition the output of the winding 13 is connected to the input of the winding 14 via a capacitor 17 having a high capacitance value and forming in practice a short circuit for the speech signals. The input of the winding 13 and the output of the winding 14 are connected to the two moving contacts of two change-over circuits 18 and 19, respectively, whose make-and-break contacts are interconnected as shown in the FIGURE. The two simultaneously controlled change-over circuits have for their function to change the polarity of the power supply battery voltage on the two wires 5 and 6 of the subscriber line. The interface circuit 1 comprises two further change-over circuits 20 and 21, whose break contacts are connected to the terminals of the power supply battery via the change-over circuits 18 and 19 and whose make contacts are connected to the terminals of an alternating ringing voltage generator 103 via the two wires 101 and 102 of a bus, which is commonly referred to as the ringing bus, which is common to all the interface circuits to be tested; the moving contacts of the change-over circuits 20 and 21 are connected to the terminals 3 and 4 of the interface circuit. The two change-over circuits 20 and 21 which are controlled simultaneously have for their function to establish between the two wires 5 and 6 of the subscriber line either the direct voltage of the power supply battery or the alternating ringing voltage.

The interface circuit 1 also comprises a control arrangement 22 which includes the elements such as relay coils and electronic circuits serving to control the change-over circuits (18, 19) and (20,21) from the so-called signaling signals appearing at the terminal 23 of the interface circuit and conveyed to all the interface circuits via the bus 104, which is used jointly by all the interface circuits. The signaling signals used for control purposes in the interface circuit are generated by the control and processing unit 105 of the telephone exchange which further has for its function to control the connections in the connecting network 100, as a function of the telephone links to be formed. This control and processing unit 105 may also be near to or remote from the interface circuits to be tested. Finally, the interface circuit 1 comprises a loop detection circuit 24 which has for its function to detect whether the subscriber loop is open or closed. This detection is effected by differential measurement of the direct current supplied by the power supply battery to the subscriber line. For that purpose, the loop detector 24 is connected to those terminals of the resistors 15 and 16 which are not connected to the terminals of the battery. The information about the state of the loop forms a signaling signal which appears at the terminal 25 and is applied to the bus 106 which is common to all the interface circuits to be tested, and is thereafter transmitted to the control and processing unit 105.

The interface circuit 2 comprises exactly the same elements as the interface 1 which are wired in the same manner, and is connected in the same manner by means of one side to the two-wires of a subscriber line and by means of the other side to the connecting network 100 and to the control and processing unit 105 of the telephone exchange. All the elements which are part of the interface circuit 1 and are denoted by the reference numerals 3 to 25 are also present in the interface circuit 2 and are denoted by the respective reference numerals from 53 to 75. It must be understood that other interface circuits, not shown, are connected to other subscriber lines, to the common ringing generator 103 and to the components 100 and 105 of the telephone exchange.

As mentioned in the foregoing, in the known systems for testing interface circuits, each interface circuit is always tested separately. For example, in one known system, an interface circuit to be tested such as the interface circuit 1 is simultaneously connected at the test instant to an automatic test apparatus by means of its two-wire terminal means 3 and 4, its four-wire terminals means 7 and 8 and its signaling terminal means 23 and 25. But with this system remote testing of interface circuits for example from a telephone exchange, is not possible, as these interface circuits are normally not connected to this exchange via their two-wire terminal means. In the other prior art test system described in French patent specification No. 2,399,775 it is not necessary to connect the two-wire terminal means of the interface circuits to the automatic test apparatus but only a simple continuity test of the speech circuits of the interface circuit 1 is, for example, effected by unbalancing its hybrid junction 11 at the moment a test is performed. In contrast therewith the present invention makes it possible to perform a complete test of the interface circuits without the necessity of connecting their two wire terminal means to an automatic test apparatus.

To describe the test system in accordance with the invention, let it be assumed that the interface circuits to be tested, such as the interface circuits 1 and 2, are remote from the telephone exchange or are provided in the connecting network 100 and the control and processing unit 105. The links shown by means of broken lines between the connecting network 100 and the unit 105 on the one hand and the interface circuits on the other hand may be effected in any arbitrary manner by means of wires or not by means of wires, by means of multiplexing or not by means of multiplexing. An automatic test apparatus 107 has two terminals 108, 109, which are connected in the apparatus to a dialing signal transmitter and a receiver, not shown, respectively. These dialing signals constitute the test signals for testing the interface circuits in the voice signal band. These transmit and receive terminals 108 and 109 are connected to corresponding terminals of the connecting network 100. The automatic test apparatus 107 also has a terminal 110 for transmitting control signals towards the control and processing unit 105. More specifically, for a control signal appearing at the terminal 110 the unit 105 can establish the connecting network 100 in such a configuration that the dialing signal transmit terminal 108 is connected to the receiving terminal of an interface circuit and that the dialing signal receive terminal 109 is connected to the transmit terminal of another interface circuit. Under the influence of further control signals appearing on terminal 110, the unit 105 may furnish different signaling control signals towards any interface circuit. Finally, the automatic test apparatus 107 has a terminal 111 for receiving the result of the signal processing action effected in unit 105 and more particularly of the loop detection signal coming from any interface circuit.

In the test system of the invention there are associated with each interface circuit such as the interface circuit 1 two inverting change-over circuits 26 and 27, whose moving contacts are connected to two terminals 3 and 4 of the two-wire terminal means of the interface circuit, whose break contacts are connected to two wires 5 and 6 of the subscriber line and whose make contacts are connected to two wires 112, 113, which form a two-wire bus which is common to all the interface circuits and which will be denoted test bus hereinafter. The two inverter change-over circuits 26 and 27 are simultaneously controlled by circuits incorporated in the control device 22 from the signals produced in the control and processing unit 105. In the rest condition and outside the test period, these two change-over circuits 26 and 27 may be brought to the working position during the test period under the influence of control signals supplied by terminal 110 of the test apparatus 107; the two terminals 3 and 4 of the two-wire terminal means of the interface circuits are thus connected to the test bus 112, 113. Two change-over circuits 76 and 77 which are connected and controlled in the same manner as the two change-over circuits 26 and 27 are associated with the interface circuit 2. The two wires 112, 113 of the test bus are connected by means of one end to the series arrangement of the resistor 114 and the diode 115.

In the test system in accordance with the invention, for the whole group of interface circuits to be tested using the same ringing signal generator 103, there are provided two inverter change-over circuits 116, 117 whose moving contacts are connected to the two wires 101, 102, whose break contacts are connected to the two terminals of the ringing signal generator 103 and, finally, whose make contacts are connected to the two terminals of the dialing signal generator 118. These two change-over circuits 116, 117 are simultaneously controlled by the control device 119, from a control signal produced in the unit 105, for providing on the wires 101, 102 either the ringing signal or the dialing signal.

The different operations to be effected in the system in accordance with the invention for testing the different circuits of the interface circuits will now be described. In practice, the operations are automatically performed under the control of the automatic test apparatus 107. This apparatus which a person skilled in the art can easily construct on the basis of the description of the several operations he must control will not be described in detail.

To perform testing of the speech circuits, the two-wire terminal means of the two interface circuits such as 1 and 2 are simultaneously coupled to the wires 112, 113 of the test bus. For this purpose the change-over circuits 26, 27 and 76, 77 are controlled thus that they are adjusted to the working position, which is the opposite of the position shown in the FIGURE. The change-over circuits 20 and 21 are adjusted to the rest position, shown in the FIGURE, to accomplish that the two interface circuits can transmit the speech signals. A first part of the test of the speech circuits of the two interface circuits 1 and 2 consist therefore in having appear on the receiving terminal 7 of the interface circuit 1 a dialing signal which, in the case of proper operation, must appear between the terminals 3 and 4 of the interface circuit 1, but which must thereafter be applied to between the terminals 53, 54 of the interface circuit 2 via the test bus 112, 113 and must finally appear at the transmit terminal means 58 of the interface circuit 2. In this manner the speech circuit of the interface circuit 1 is tested in the direction from the exchange to the subscriber and the speech circuit of the interface circuit 2 in the direction from the subscriber to the exchange. A second part of the test allows testing of the speech circuit of the interface circuits 1 and 2 in the opposite direction; to achieve this, it will be evident that on the receive terminal means 57 of the interface circuit 2 there must appear a dialing signal which, in the case of proper operation, must be conveyed to the transmit terminal means 8 of the interface circuit 1. If in one of the two effected tests poor functioning of the tested speech signal is found, it is known if the poorly functioning speech circuit belongs to the interface circuit 1 or to the interface circuit 2, but it will be obvious that this doubt can be removed by performing the same test again on the interface circuit 1 or the interface circuit 2, coupled via the test bus to another properly operating interface circuit. All the controls just described, which are necessary to test the speech circuit of the interface circuit can be performed from the test apparatus 107; as explained in the foregoing, the change-over circuits 26, 27 and 76, 77 are controlled by means of unit 105. The connecting network 100 is also controlled by means of the unit 105 in order to have the dialing signal supplied by the ringing signal transmitter of the test apparatus 107 appear on a receive terminal of an interface circuit and to have the diaing signal received on a transmit terminal of an interface circuit appear on a dialing signal receiver of the test apparatus 107. Last-mentioned apparatus also comprises all the apparatus necessary to measure the transmitted and received signals.

To perform testing of the ringing circuits of the interface circuits 1 and 2, that is to say testing of the change-over circuits (20, 21) and (70, 71) and their control circuits incorporated in the devices 22 and 72, the change-over circuits 26, 27 and 76, 77 are controlled in such a manner that they are adjusted to their working position for coupling the two-wire terminal means of the interface circuits 1 and 2 to the two wires 112, 113 of the test bus. At the same time, the two change-over circuits 116, 117 are controlled in such a manner that they are adjusted to the working position, which is the position opposite to that shown in the FIGURE, to achieve that a dialing signal supplied by the generator 118 appears on the two wires 101, 102 of the ringing bus. To test the ringing circuit of the interface circuit 1, the change-over circuits 20 and 21 are adjusted to the ringing position, that is to say to the working position, which is the position opposite to that shown in the FIGURE. So, in the case of proper operation, the dialing signal present on the two wires 101, 102 of the dialing bus appears between the two terminals 53, 54 of the interface circuit 2, via the test bus 112, 113; thereafter this dialing signal is conveyed towards the transmit terminal means 58 of the interface circuit 2 via the break contacts of the change-over circuits 70, 71 and the speech circuit of the interface circuit 2. Testing the ringing circuit of the interface circuit 2 is performed in a similar manner by adjusting the two change-over circuits 70 and 71 to the ringing position which is the position opposite to that shown in the FIGURE. It will here be obvious that all the controls necessary for testing the ringing circuits may be performed from the test apparatus 107. It is also possible to measure in this test apparatus the dialing signals coming from the terminal 108 via the path indicated above and received via the connecting network 100. It should be noted that, to try the ringing circuits, it is not necessary to use a special dialing signal generator 118 by simply using, as the dialing signals, the signal produced by the ringing signal generator 103 and which is sufficiently to a sufficient extent, so that they can be applied to the speech circuits of the interface circuits.

In order to perform the test of a loop detection circuit, for example the loop detection circuit 24 of the interface circuit 1, the two change-over circuits 20 and 21 are adjusted to the rest position indicated in the FIGURE. The test of the loop detection circuit 24 consists in successively adjusting the change-over circuits 26 and 27 associated with the interface circuit 1 to their rest positions and to their working positions. When the two change-over circuits 26 and 27 are in the working position which is the position opposite to that shown in the FIGURE, a direct current supplied by the battery which is connected to the positive and the negative supply terminals of the interface circuit circulates through the two wires 112, 113 of the test bus which is closed via the series arrangement of the resistor 114 and the diode 115, connected in the suitable direction; when the resistance value of a resistor 114 is substantially equal to the normal resistance of a subscriber loop, this current is equal to the normal current in a subscriber loop. When the two change-over circuits 26 and 27 are in their rest positions shown in the FIGURE, this loop current in the test bus is cancelled. The loop detector 24 which is provided to measure the direct current generated by the interface circuit on its two-wire terminal means 3 and 4 will then produce, when it operates properly, the information whether the loop is closed or open, according as the change-over circuits 26 and 27 have been adjusted to the working position or to the rest position. It should be noted that in order to test the loop detection circuit the diode 115 is not required; in contrast therewith this diode is indispensable for testing the battery inverter circuit.

To perform the test of the battery inverter circuit of, for example, interface circuit 1, that is to say the change-over circuits 18 and 19 and their control circuit incorporated in the device 22, the change-over circuits 20 and 21 are adjusted to the rest position shown in the FIGURE and the change-over circuits 26 and 27 are adjusted to the working position, which is the position opposite to that shown in the FIGURE. The battery inverter circuit test consists in successively adjusting the change-over circuits 18 and 19 to the rest position and to the working position. When the change-over circuits are in the rest position shown in the FIGURE, the normal loop current circulates through the two wires 112, 113 of the test bus, which is closed via the series arrangement of the resistor 114 and the diode 115. When the two change-over circuits 18 and 19 are in the working position which is the position opposite to that shown in the FIGURE, the battery voltage is inverted and the diode 115 prevents the loop current from circulating in the test bus. Consequently, when the battery inverter circuit of the interface circuit 1 operate properly, the loop detector 24 indicates an interruption of the loop each time the battery voltage is inverted.

From the details furnished in the foregoing it will be obvious that the control signals necessary for testing the loop detection circuit and the battery inverter circuit may be obtained completely from the test apparatus 107, while it is possible to check in this test apparatus the response of the interface circuit to the control signals.

In the test system described in the foregoing the same test apparatus 107 may also serve for testing several groups of interface circuits which are in geographically separate locations. The different elements, the test apparatus, connecting network, the control and processing unit, interface circuits may be in any geographical location provided that, under the control of the test apparatus, communications may be set up between this apparatus and the interface circuits.

What is claimed is:

1. A system for testing subscriber line interface circuits (1, 2) each having one end connected to a subscriber line and the other end connected, during a test, with a test apparatus (107) for transmitting test signals toward one of said interface circuits and receiving from another of said interface circuits signals corresponding to said test signals, comprising:

a test bus (112, 113) for a group of said interface circuits;

first change-over means (22, 26, 27 or 72, 76, 77) for disconnecting each interface circuit from its subscriber line and connecting it to said test bus; and control means for causing said first change-over means to connect one interface circuit or two interface circuits to said test bus, depending upon the test to be effected.

2. A test system as claimed in claim 1 wherein the other end of each interface circuit comprises a transmit terminal means (7 or 57) and a receive terminal means (8 or 58), the test apparatus (107) comprises a dialing signal transmitter and dialing signal receiver, control means for simultaneously connecting the receive terminal means of one of said interface circuits (1 or 2) to said dialing signal transmitter and the transmit terminal means of another of said interface circuits (2 or 1) to said dialing signal receiver, a signal supplied by said dialing signal receiver being indicative of the speech circuit tested in the two interface circuits.

3. The test system as claimed in claim 1 further comprising a ringing signal generator (103), a dialing signal generator (118), second change-over means (116, 117) for connecting said dialing signal generator in place of said ringing signal generator, and wherein the test apparatus comprises a dialing signal receiver, control means for causing the second change-over means to connect said dialing signal generator in place of said ringing signal generator and for causing the first change-over means to simultaneously connect two interface circuits to be tested to the test bus, means for switching one of said two interface circuits to the ringing state and means for connecting the other one of said two interface circuits to said dialing signal receiver, a signal supplied by said dialing signal receiver being indicative of the operation of the ringing circuit of the interface circuit that has been switched to the ringing state.

4. A test system as claimed in any one of the claims 1 to 3 wherein each interface circuit has a loop detector, the test bus is closed via an impedance (114) which has substantially the resistance of a normal subscriber loop and wherein the test apparatus further comprises means for generating a control signal for successively connecting and disconnecting each interface circuit to be tested to and from the test bus and means for directing to the test apparatus the output signal of the loop detector of the interface circuit connected to the test bus, a comparison between said output signal and the control signal for successively connecting and disconnecting the interface circuit being indicative of the operation of the loop detector of the interface circuit.

5. A test system as claimed in any one of claims 1 to 3 wherein each interface circuit has a loop detector and a battery inverter circuit (18, 19 or 68, 69), the test bus is closed by the series arrangement of a diode (115) and an impedance (114) having substantially the resistance of a normal subscriber loop, said test apparatus comprises control means for causing said first change-over means to connect each interface circuit to be tested to the test bus, control means for producing a control signal for causing successive operations of the battery inverter circuit of the interface circuit being tested, and means for conveying to the test apparatus the output signal of the loop detector of the interface circuit being tested, the comparison between said output signal and the control signal causing the successive operations of the battery inverter circuit being indicative of the operation of the battery inverter circuit of the interface circuit to be tested.

6. The test system as claimed in claim 1 wherein said control means and test apparatus are at a first location and said subscriber line interface circuit, test bus, and change-over means are at a second location remote from said first location.

7. A method for testing remotely located subscriber line interface circuits connected to a central exchange only by their four-wire terminal means and their terminals for control signals and loop detection signals comprising the steps of:
   a. disconnecting the two-wire terminal means of two interface circuits from their associated subscriber lines and connecting said two-wire terminal means together;
   b. transmitting test signals toward one of said two interface circuits; and
   c. receiving from the other of said two interface circuits signals corresponding to said test signals and indicative of a circuit tested in said one interface circuit.

* * * * *